Patented Apr. 15, 1941

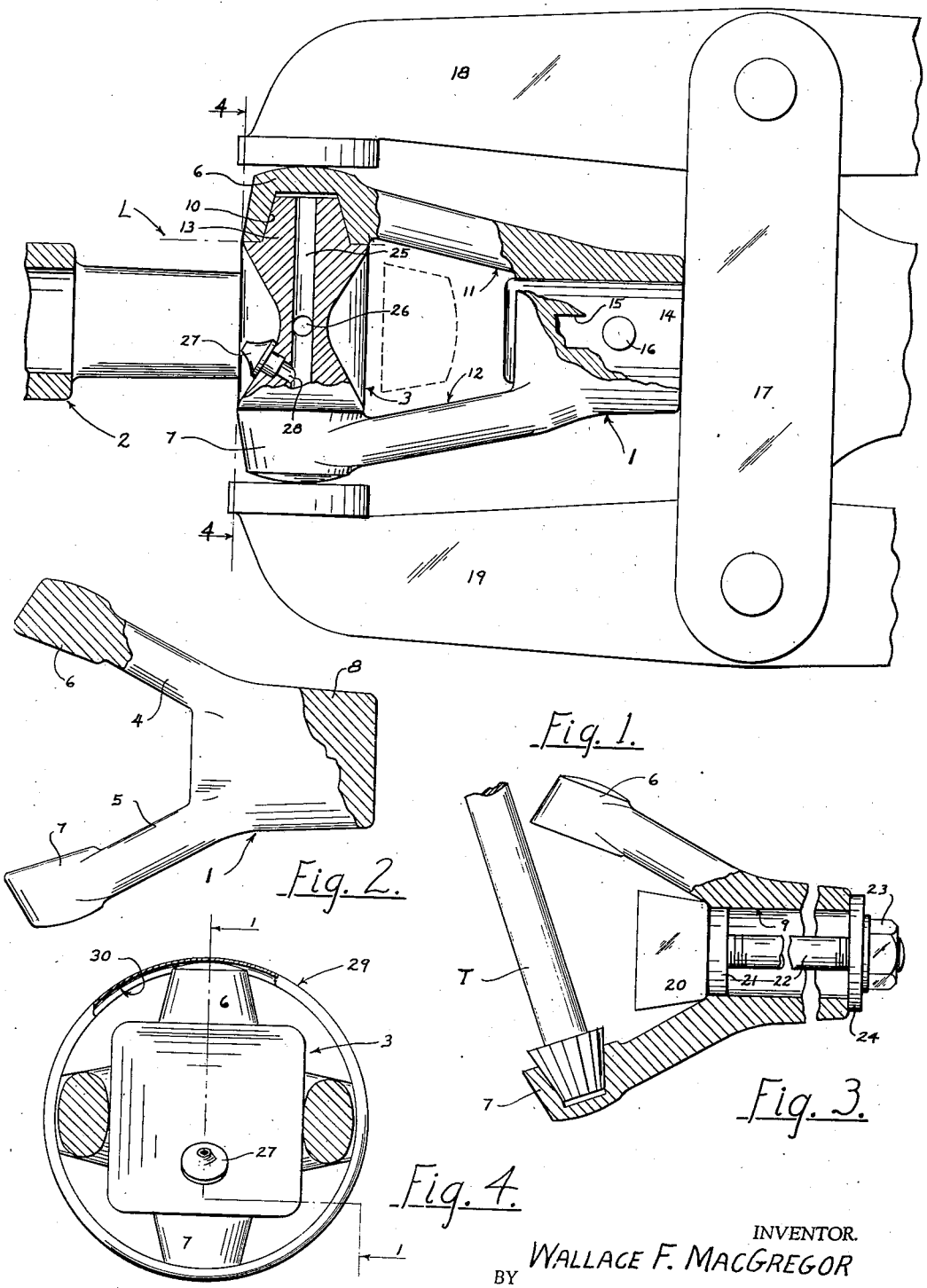

2,238,335

UNITED STATES PATENT OFFICE 2,238,335

UNIVERSAL JOINT

Wallace F. MacGregor, Racine, Wis., assignor to J. I. Case Company, Racine, Wis., a corporation Application February 8, 1937, Serial No. 124,681

8 Claims. (Cl. 64—17)

The present invention relates to universal joint, and an object of the invention is to provide a universal joint of great strength, reliability and simplicity.

A further object is to provide a method which makes possible the manufacture of an entirely new type of joint which cannot come apart in service, and one which cannot be disassembled for tampering or the like.

A further object is to provide a universal joint having but three major pieces, all of which are permanently united in the structure, and further objects and advantages will become apparent from the following specification and accompanying drawing, in which:

Figure 1 is a plan view of an illustrative embodiment of a joint including the invention, with parts broken away, and including a diagrammatic representation of typical apparatus used in assembling it.

Fig. 2 is a similar view of an element of the joint.

Fig. 3 is a similar view indicating a step in the manufacture thereof, and illustrating alternative apparatus for the practice of the invention.

Fig. 4 is a sectional view of the device taken on the line 4—4 of Fig. 1, showing a safety ring which may be used with the device.

Similar reference characters have been applied to the same parts throughout the drawing and specification.

As seen in Fig. 1, the joint assembled in accordance with the invention comprises yokes generally designated as 1 and 2, and an interposed trunnion block or the equivalent, 3, assembled in the manner shown, the expedients and processes used constituting part of the invention.

As will be apparent from Fig. 1, a joint such as the present would be impossible to assemble by known methods, and difficult and expensive to machine. In applicant's process, however, the yokes 1 and 2 are formed of suitable material, as for example by forging, in the form shown in Fig. 2, having diverging arms 4 and 5 terminating in bearing portions 6 and 7, the arms extending from a hub or shank portion 8. The necessary machine work is done on the piece in this form, shank 8 being bored at 9 as shown in Fig. 3, and sockets 10—10 being formed in bearing portions 6 and 7 by means of a tool T, which, owing to the angle of the diverging arms, enters either bearing portion without interference from the other.

When these operations are complete arms 4 and 5 are heated in the region of 11 and 12 and closed about block 3, the sockets 10—10 enclosing the previously prepared trunnions 13—13. When the parts have cooled the block is engaged by its trunnions in proper running relation with the yoke, and cannot be dislodged therefrom except with a force sufficient to destroy the structure.

Although heating is usually resorted to in order to facilitate bending of the arms, it is to be understood that, under certain circumstances, it may be desirable to bend the arms cold, and that this may be done entirely within the contemplation of the invention. It is also to be understood that the invention is not to be taken as limited by anything in this specification, or in fact in any manner except as defined in the claims.

In closing the arms about the block it is important to bring the sockets into predetermined relation to the bore 9, and the bending movement of the arms is accordingly accurately controlled so that neither arm is bent beyond a predetermined position. This may be done in various ways, in Fig. 1, the yoke being mounted on an arbor 14, and located by means of its keyway 15 engaging a pin or other guide 16. Arbor 14 is fixed on a member 17 carrying pivoted jaws 18 and 19 arranged to engage the outer surfaces of bearing portions 6 and 7. The jaws are actuated by any suitable mechanism to perform a regulated movement such that each jaw, considered independently of the other, during one operation, moves through a distance relatively to the extended center line of arbor 14 a distance equal to that through which the other moves.

In this way the bearing portions are kept throughout the bending process symmetrically disposed about the hub, and when the process is complete block 3 is located accurately on the center line of the hub. Arms 18 and 19 may be arranged to stop at positions where the running clearance is correct between trunnions 13—13 and sockets 10—10.

The process is not dependent upon any specific apparatus for its execution, however, and an alternative expedient is shown in Fig. 3, in which a forming block or guide 20 is suitably fixed in relation to bore 9 as by means of a shoulder 21, the whole being rigidly held in place by a bolt 22 tensioned by a nut 23 engaging a washer 24 abutting the end of the hub. With this in place the arms may be bent by any suitable means of exerting pressure thereon, and the movement need not be uniform, since, as soon as one arm comes into contact with the guide block, further movement must necessarily be in the other arm, and when both are in contact with said block the sockets are properly and symmetrically disposed about the center line of the hub. With bolt 22 removed the forming block may be released from bore 9 by a slight movement toward trunnion block 3, and then removed from the completed structure by a movement transverse to the arms.

As will be understood, when one yoke and the block are united the resulting sub-assembly is held in position while the other yoke 2 is closed over the remaining trunnions, when the joint is complete.

As seen in Fig. 1, block 3 provides lubricant passageways 25, running through from one trunnion to the opposite trunnion, and, in the present instance, opening through the ends thereof, a second passageway 26 intersecting passageway 25 and opening through the remaining trunnions, and a lubricating device or fitting 27 is provided on one face of the block and communicating with a passageway 28 opening into one of passageways 25 and 26. Lubricant flowing from the device 27 accordingly flows through the passageways and finds its way to all the trunnion bearing surfaces.

It is to be noted that the ends of sockets 10—10 are imperforate, and that these imperforate ends run at a greater radius than do the joints between the trunnion block and the inner surfaces of the bearing elements, and for this reason it is impossible for the rotation of the joint to tend to throw all the lubricant out of the mechanism, the sockets constituting inwardly facing cups, and the centrifugal force arising from the rotation tending to maintain the lubricant in the cups instead of tending to throw it out as in many prior devices.

It is to be noted also that the lubricant, when the joint is in operation, will find a "level" in the end portions of ducts 25 and 26 corresponding to the "level" in the cups, and it is thus impossible for the centrifugal force to throw this quantity of lubricant out of the ducts, the fluid remaining therein for extended lengths of time. The end portions of the ducts therefore act as reservoirs for lubricant for the bearing surfaces of the joint, the "level" reached by the fluid being indicated by the line L, Fig. 1.

As an expedient for permitting folding of a drive in which the joint is incorporated the space betweens arms 4 and 5 is made sufficiently large to receive the bearing portions of the opposite yoke, so that the joint, when not operating, may be bent through an angle of 90° or more, as suggested in Fig. 1.

If desired, for reasons of safety, or the like, the joint may be enclosed in a housing or ring 29, which may be made of spring steel or other suitable material, slightly concave inwardly, as shown at 30, and so dimensioned as to spring over the outer extremities of the trunnion sockets 6, 7, etc. During the running of the joint the ring pivots on these outer surfaces without excessive friction, and it forms a smooth outer surface for the joint, not likely to catch clothing, or to be otherwise dangerous.

Other expedients are contemplated for retaining the ring in position within the contemplation of the invention, and the same is not to be taken as limited by anything in the present specification, or in fact in any manner except as defined in the following claims:

What is claimed as new and desired to be secured by Letters Patent of the United States is:

1. A universal joint including a trunnion block and a yoke, said yoke having arms extending therefrom for engaging said trunnion block, said arms providing bearing sockets therein for receiving the trunnions of said block, end closures for said sockets, said yoke, arms, and end closures constituting a single piece of forgeable material formed to receive a machining tool for finishing the interior of said sockets and so proportioned as to be bendable into position about the trunnions of said block whereby to avoid any opening outwardly from said sockets.

2. A universal joint including a trunnion block and a hub portion, said hub having bendable arms extending therefrom for engaging said trunnion block, said arms providing tapered sockets therein for receiving the trunnions of said block, a second hub portion having arms extending therefrom also engaging said trunnion block, said arms providing sockets therein for receiving the remaining trunnions of said block, the arms of one of said hub portions being spaced to receive therebetween one of the socket portions of the other hub portion whereby the joint, when not in operation, may be folded at a sharp angle from its operating position, the arms of the first mentioned hub portion being arranged to facilitate bending from an initial open position for facilitating machining to a permanent relatively closed position in operative relation to said trunnion block, the taper of said sockets being such as to provide clearance about the trunnions for arcuate movement of said arms while bending.

3. A universal joint including a trunnion block and a hub portion, said hub having bendable arms extending therefrom for engaging said block, said arms providing tapered sockets, arranged to receive trunnions of said block, extending partly through said bearing portions and having imperforate closed outer ends, said arms being shaped to facilitate bending from an open position, in which said sockets can be machined, to a permanent closed position in operative relation to said trunnions, the taper of said sockets being such as to provide clearance about the trunnions of said block during bending of said arms, while assembling with said trunnion block, and lubricant supplying means in said block and extending into said sockets for depositing lubricant therein, the position of the sockets, and their closed ends preventing lubricant from being thrown out of the sockets by centrifugal force.

4. A universal joint including a trunnion block and a yoke, said yoke having bendable arms extending therefrom for engaging the trunnion block, outwardly tapered trunnions on the block, said arms providing tapered sockets therein for receiving trunnions of the block, the angle of taper of the trunnions and sockets being sufficient to provide free movement of the socket about the trunnion during the bending movement of the arms whereby to avoid binding of the arms on the trunnions during closing movement of the arms.

5. A universal joint including a trunnion block and a yoke, said yoke having bendable arms extending therefrom for engaging the trunnion block, outwardly tapered trunnions on the block, said arms providing tapered sockets therein for receiving trunnions of the block, the angle of taper of the trunnions and sockets being such that an element of the tapered surface of the socket furthest from the point of bending of its arm will lie within an arc having such point of bending as a center and intersecting said element at the mouth of the socket.

6. An an article of manufacture a yoke for a universal joint having a hub portion and a pair of widely divergent bendable arms positioned for facilitating machining of tapered sockets partly through the ends thereof, said arms being shaped to facilitate bending to enter the trunnions of a trunnion block into said tapered sockets and to close said yoke about said block into operative relation therewith.

7. A universal joint including a trunnion block and a yoke, said yoke having bendable arms extending therefrom for engaging the trunnion block, outwardly tapered trunnions on the block, said arms providing tapered sockets partly therethrough for receiving trunnions of the block, the angle of taper of the trunnions and sockets being sufficient to provide free movement of the socket about the trunnion during the bending movement of the arms while they are being assembled with the trunnions, and means in said block and extending into said sockets for depositing lubricant therein, the position of the sockets and their closed ends preventing lubricant from being thrown out of the sockets by centrifugal force.

8. A universal joint including a trunnion block and a yoke, said yoke having bendable arms extending therefrom for engaging said trunnion block, said arms providing tapered sockets therein for receiving the trunnions of said block, said yoke, arms, and sockets constituting a single piece of material, and said arms being arranged to facilitate machining of said tapered sockets therein, and also so proportioned as to be bendable into a permanent working position in operative relation to said trunnion block.

WALLACE F. MacGREGOR.